United States Patent [19]

Kobashi et al.

[11] Patent Number: 4,778,012
[45] Date of Patent: Oct. 18, 1988

[54] ROTARY TILLING AND GRASS CUTTING DEVICE

[75] Inventors: Teruhisa Kobashi; Ichiro Kobashi; Yoshio Touki; Yasuhiro Kobiki, all of Okayama, Japan

[73] Assignee: Kobashi Kogyo Co., Ltd., Okayama, Japan

[21] Appl. No.: 931,757

[22] Filed: Nov. 17, 1986

[30] Foreign Application Priority Data

Nov. 20, 1985 [JP] Japan .................. 60-261958

[51] Int. Cl.⁴ ............ A01B 33/14; A01B 33/16; A01D 43/12
[52] U.S. Cl. .................. 172/91; 56/11.2; 56/12.7; 56/16.9; 172/45; 172/545; 172/123
[58] Field of Search ............ 172/45, 42, 556, 123, 172/125, 91, 95, 45, 47, 445; 56/295, 12.7, 16.9

[56] References Cited

U.S. PATENT DOCUMENTS

| | | | |
|---|---|---|---|
| 2,656,662 | 10/1953 | Hines | 56/12.7 |
| 2,751,737 | 6/1956 | Herod | 56/12.7 |
| 2,990,667 | 7/1961 | Schwalm | 56/12.7 X |
| 3,028,919 | 4/1962 | Smith | 172/125 |
| 3,557,880 | 1/1971 | van der Lely | 172/91 |
| 3,952,811 | 4/1976 | Carre | 172/45 |
| 4,492,271 | 1/1985 | Doering | 172/123 |
| 4,519,459 | 5/1985 | Reaume | 172/125 |
| 4,556,113 | 12/1985 | Saito | 172/91 |
| 4,611,669 | 9/1986 | Ballard | 172/545 |
| 4,615,395 | 10/1986 | Nagamine | 172/91 |

FOREIGN PATENT DOCUMENTS 2551857 2/1977 Fed. Rep. of Germany ........ 172/91

Primary Examiner—Richard J. Johnson
Attorney, Agent, or Firm—Martin A. Farber

[57] ABSTRACT

A rotary tiling device has a cutting device having a plurality of cutters each of which is mounted on a supporting member at a base end thereof in such a manner that the cutter is rotatable about a first center. The cutter has a vertical portion and a lateral portion at an end of the vertical portion and has edges on both sides of the vertical and lateral portions. The base end has an arcuated periphery about a second center. The first center is offset from the second center, so that in grass cutting operation, the arcuated periphery is positioned in a position which is further outward than its position in the soil cutting operation.

7 Claims, 5 Drawing Sheets

ROTARY TILLING AND GRASS CUTTING DEVICE

BACKGROUND OF THE INVENTION

The present invention relates to a rotary tilling device having a rotary cutting device.

The rotary cutters in the rotary cutting device rotate downwardly or upwardly in the soil to break up the surface soil. The conventional rotary tilling device is used for only cultivating the soil and is not constructed to perform other work such as mowing.

The applicant proposed a rotary tilling device which is also used for mowing by a rotary cutter device in the opposite direction. In the rotary tilling device, each cutter is rotatably mounted on a supporting member and held at an angular position when tilling. During the tilling operation, soil and mud stick to a periphery of a lower portion of the cutter and to other portions in the device. The stuck soil and mud prevent the cutter from rotating to a proper position for mowing when the cutter is rotated in the opposite direction. Accordingly, desirable cutting operation is not performed.

SUMMARY OF THE INVENTION

Accordingly, the object of the present invention is to provide a rotary tilling device which may perform the mowing operation without the obstacle of stuck soil and mud.

According to the present invention, there is provided a rotary tilling device comprising, a rotary shaft rotatably supported on frame means, a plurality of supporting members secured to the rotary shaft, at least two cutters rotatably mounted on each of the supporting members at opposite positions thereof, holding means provided on the supporting member for holding the cutter in the soil cutting position and for releasing the cutter in the grass cutting position, and transmitting means for transmitting power of a tractor to the rotary shaft to rotate it.

Each cutter has a vertical portion, a base end portion at which the cutter is rotatable about a first center, and a lateral portion bent at another end of the vertical portion in the axial direction of the rotary shaft, and having a soil cutting edge and a grass cutting edge on both sides of the vertical and lateral portions. The base end portion has an arcuate periphery about a second center. The first center being offset from said second center towards the soil cutting edge, so that, in a grass cutting position, the arcuate periphery is located in a more outer position than a position in a soil cutting position.

Another object of the present invention is to provide a tilling device in which mud and soil clogged between the cutters and supporting members during the tilling operation fall off easily so that the cutters are freely rotated during mowing operation.

The other objects and features of this invention will become understood from the following description with reference to the accompanying drawings.

BRIEF DESCRIPTION OF THE DRAWINGS

FIG. 2b is an enlarged view showing a part of FIG. 2a;

DETAILED DESCRIPTION OF THE DRAWINGS

Figure 1:
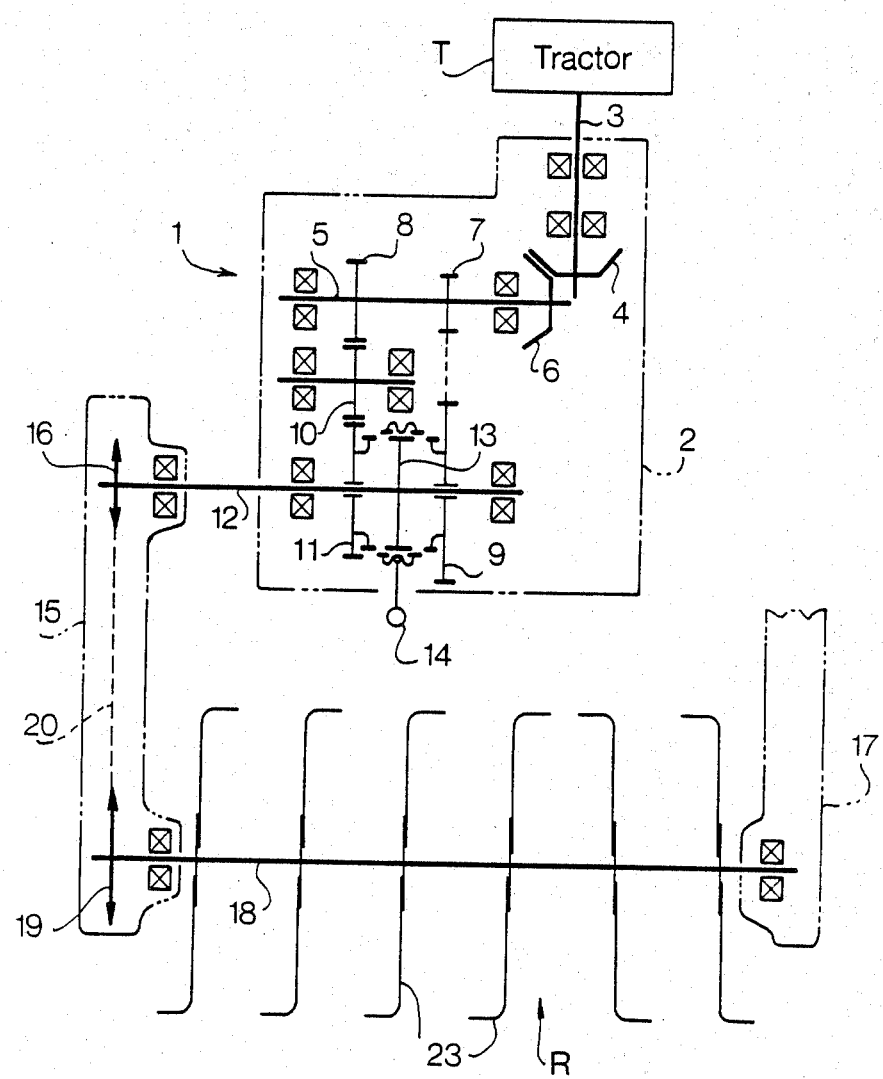
FIG. 1 is a schematic diagram showing a power transmission system of rotary tilling device of the present invention.

Referring to FIG. 1, a rotary tilling device 1 according to the present invention is adapted to be drawn by a tractor T and attached thereto by a three-point linkage (not shown) so as to be lowered and raised. The rotary tilling device 1 has a gearbox 2 provided at a middle portion relative to the lateral direction thereof, an output shaft 12 projecting from the gearbox 2, a downwardly extending chain case 15 from the end of the output shaft 12, and supporting frame 17 provided at the other side of the machine. The gearbox 2 has an input shaft 3, one end of which is connected to the tractor T by way of an universal joint, transmission shaft and power take-off shaft. A bevel gear 4 fixedly mounted on the other end of the input shaft 3 engages with a bevel gear 6 mounted on an intermediate shaft 5. A gear 7 secured to the intermediate shaft 5 is engaged with a gear 9 rotatably mounted on the output shaft 12, providing a large reduction ratio. A gear 8 also securely mounted on the intermediate shaft 5 engages an idler gear 10 which in turn engages a counter gear 11 rotatably mounted on the output shaft 12. Between the gears 9 and 11, a shift gear 13 is slidably secured by a spline engagement to the output shaft 12. The gear 13 is selectively engaged with gears 9 and 11, in order to operatively connect the gear 9 or 11 with the output shaft 12. A shift lever 14 projecting from the gear box 2 is connected with the slidable gear 13 for the selecting operation. The output shaft 12 has a sprocket wheel 16 at an end portion. The sprocket wheel 16 is connected to a sprocket wheel 19 fixedly mounted on a rotary shaft 18 through a chain 20. The rotary shaft 18 is rotatably supported on lower portions of the chain case 15 and the supporting frame 17.

Figure 2A:
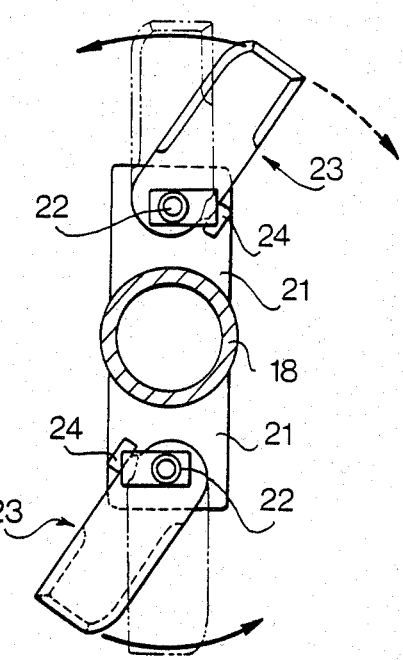
FIG. 2a is a side elevational view of a supporting member and cutters of the rotary tilling device of FIG. 1.
Figure 2B:
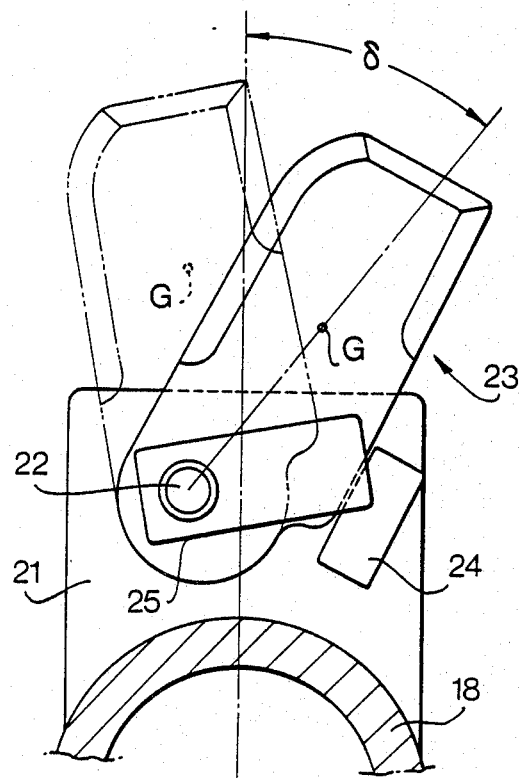
Figure 3:
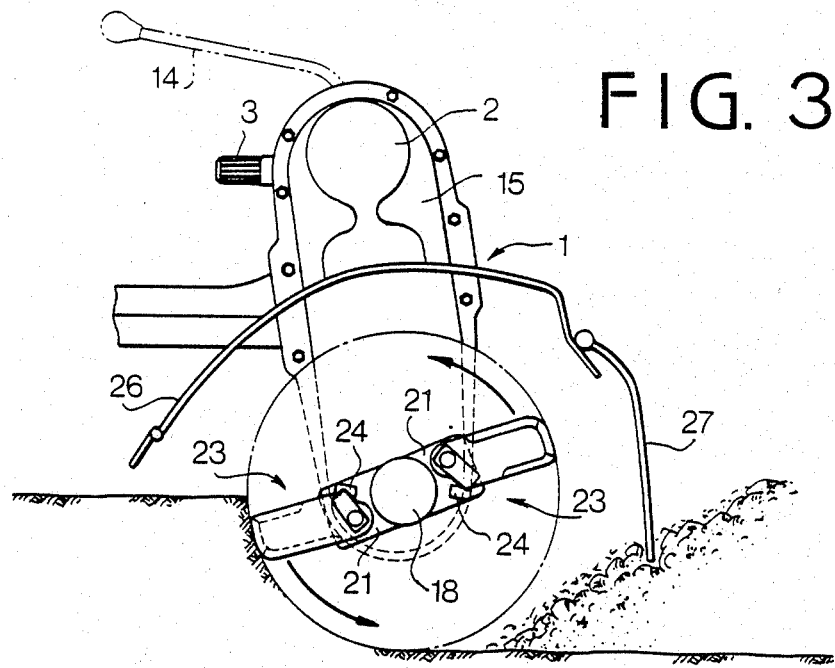
FIG. 3 is a side elevational of the rotary tilling device during tilling operation.
Figure 4:
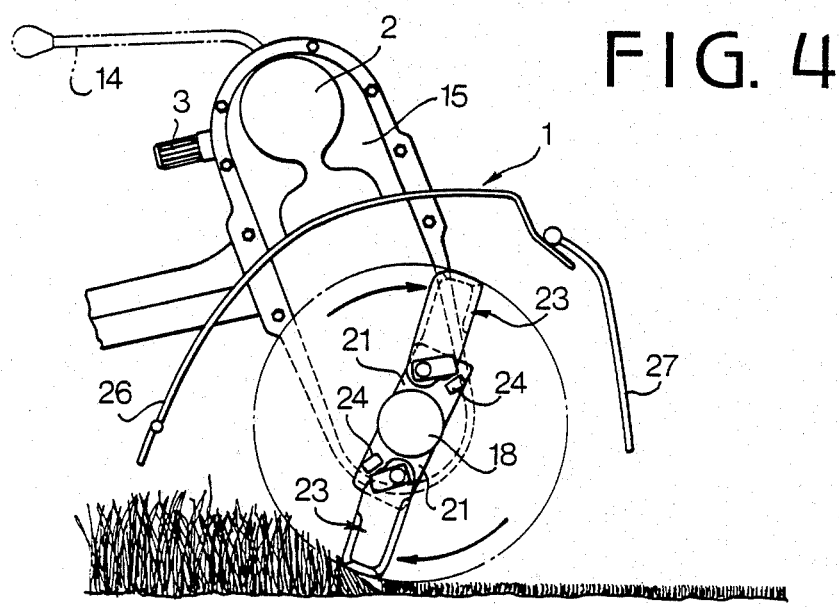
FIG. 4 is a side elevational view of the rotary tilling device during grass cutting operation.
Figure 5A:
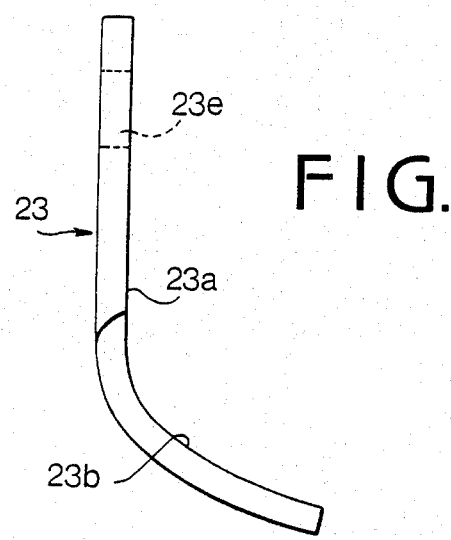
FIG. 5a is a front elevational view of a cutter.
Figure 5B:
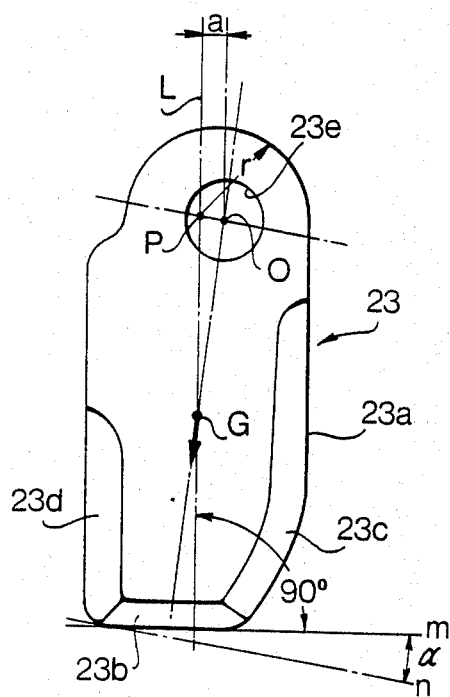
FIG. 5b is a side elevational view of the cutter.
Figure 5C:
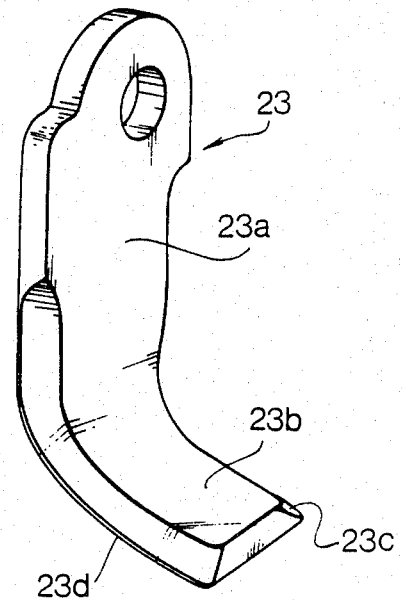
FIG. 5c is a perspective view showing a cutter.

A rotary cutting device R has a plurality of supporting members 21 (FIG. 2a) radially and securely mounted on the rotary shaft 18. As shown in FIGS. 2a and 2b on opposite end portions of the supporting members 21, cutters 23 are pivotally supported by pivot bolts 22, respectively. As shown in FIG. 5a to 5c, each cutter 23 is made by bending a rectangular metal plate to form a vertical portion 23a and a lateral portion 23b thereby forming an L shape section. A soil cutting edge 23c and a grass cutting edge 23d are formed on opposite sides of a lower portion of the vertical portion 23a and on opposite sides of the lateral portion 23b, edge 23c being for tilling and 23d for mowing. A stopper 24 is provided on the supporting member 21 to receive the load exerted on the cutter 23 and to hold it at a tilling position shown by a solid line in FIG. 2a, at which the cutter has an angular disposition for tilling, when the rotary shaft 18 and the supporting member 21 are rotated in a tilling direction (downward cutting direction) shown by arrows in solid line. The stopper 24 is so positioned to assure that the cutter 23 is inserted into the soil at a certain entering angle δ (FIG. 2b) for efficient inverting and turning of soil. In addition, a spring plate 25 is secured together with the cutter 23 to the supporting member 21 by the bolt 22 to prevent the deflection of the cutter in the axial direction of the bolt. As shown in FIG. 3, covers 26 and 27 are provided above the front and rear portions of the rotary tilling device 1.

For effective grass cutting, it is preferable to mount the cutter 23 on the supporting member 21 so as to form a certain angle between the surface of the ground and the bottom of the cutter 23. As shown in FIG. 5b, in the cutter 23 of the present invention, the center O of a hole 23e for securing the cutter by the bolt 22 is offset by a mm from a center line L of the cutter 23 towards the soil cutting edge 23c. A bottom line m of the cutter 23, which is at a right angle to the center line L, and line n, which is at a right angle to a line indicating the direction of the centrifugal force, intersecting the center O and the center G of gravity, make an appropriate cutting angle α. A base portion of the cutter 23 is formed in semicircle having a radius r about a center P. The center P is positioned on the center line L which intersects the center G of gravity.

The operation of the machine is described hereinafter.

For the tilling operation, the shift lever 14 is shifted so that the shift gear 13 is in engagement with the gear 9. Accordingly, the power of the engine supplied to the input shaft 3 is transmitted to the output shaft 12 through bevel gears 4 and 6, and gears 7 and 9. The power is further transmitted to the rotary shaft 18 through the sprocket wheels 16, 19 and the chain 20. Accordingly, the rotary shaft 18 is rotated at a low speed in the tilling direction. As shown in FIG. 3, as the tractor draws the rotary tilling device 1, the edge 23c of each cutter 23 cuts through the soil to cultivate the surface of the soil. The stopper 24 holds the cutter 23 at one side thereof preventing the cutter 23 from further rotating in the counter-tilling direction due to the load exerted on the cutter 23. Thus, the soil is cultivated by the tilling device.

When the shift lever 14 is shifted to engage the shift gear 13 with the reverse gear 11, the device is in the state for the grass cutting operation.

The direction of the rotation of the rotary shaft 18 is reversed compared to the tilling direction, as shown by the arrow in dashed line in FIG. 2a. Since reverse gear 11 is smaller than gear 9, the speed of the rotation of the rotary shaft 18 is faster than the tilling operation thereby generating a large centrifugal force. Accordingly, the cutter 23 is disengaged from the stopper 24 and rotates about the bolt 22 and is held at a radial position shown by a chain line of FIG. 2b. As a result, grass growing on unplowed land is cut in the same manner as a conventional rotary flail-type cutter.

Figure 6:
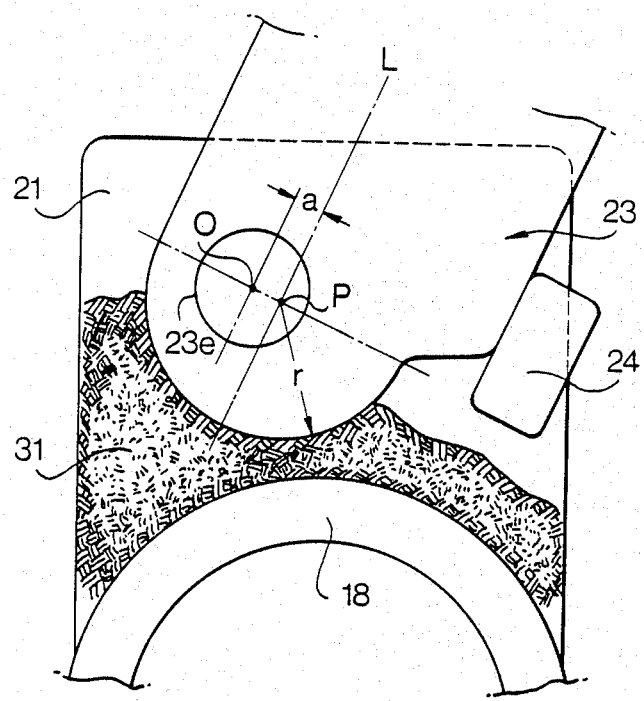
FIG. 6 is an enlarged view of a base portion of the cutter during tilling operation.
Figure 7:
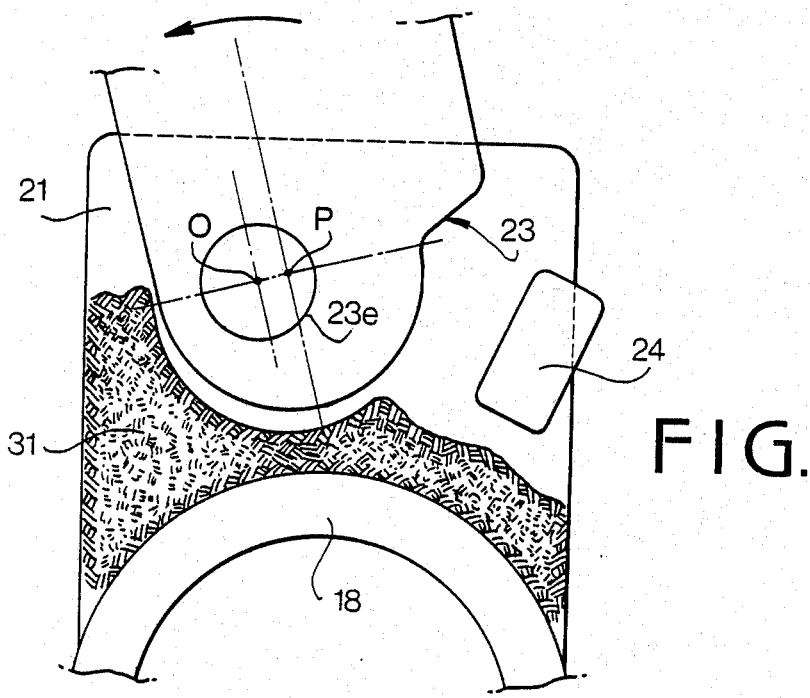
FIG. 7 is an enlarged view of the base portion of the cutter during grass cutting operation.

During the tilling operation, as shown in FIG. 6, mud and soil 31 are apt to stick to the base portion of the cutter 23 and the supporting member 21 and clog the space therebetween. When the rotary shaft is rotated at a high speed in the opposite direction for the grass cutting operation, the cutter 23 rotates in the direction of an arrow shown in FIG. 7. The center O of the hole 23e is offset from the center P of the semicircle by a mm towards the soil cutting edge 23c. Accordingly, when the cutter 23 rotates to the grass cutting position (FIG. 7), the periphery of the base portion is disposed at a position further out than in the position in the soil cutting operation so that the periphery disengages from the stuck soil 31. Therefore, friction on the cutter 23 is reduced so that the cutter 23 is reliably rotated to the radial position.

In the present embodiment, the rotation speed of the rotary shaft is preferably between 200 to 300 r.p.m. for the tilling operation and about 800 r.p.m. for the grass cutting operation.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A rotary tilling device having a frame and drawn by a tractor comprising:
    a rotary shaft disposed in a lateral direction with respect to a travelling direction and horizontal with respect to the ground, and rotatably supported on the frame;
    a plurality of supporting members secured to the rotary shaft;
    at least two cutters each pivotally mounted by a bolt on each corresponding member at diametrically opposite positions thereof;
    each of the cutters having a vertical portion, a base end portion at one end of the vertical portion being positioned closely adjacent the rotary shaft, and each base end portion of each cutter being pivotal about a first center comprising an axis of the bolt, each cutter having a lateral portion bent at the other end of the vertical portion in the axial direction of the rotary shaft, and each cutter having a tilling edge on at least a front side of the vertical portion and a moving edge on at least a rear side of the lateral portion, the base end portion having a curved contour adjacent said rotary shaft, said curved contour curving about a second center;
    said first center being offset from said second center in a direction towards the tilling edge, so that, in a first pivoted grass cutting position of the cutter pivoted in a direction toward the front side, the curved contour is located in a position radially further outward from said rotary shaft than the position of said curved contour from said rotary shaft in a second pivoted soil cutting tilling position of the cutter pivoted in a direction toward the rear side;
    holding means provided on the supporting member for holding the cutter in the second pivoted soil cutting tilling position and for releasing the cutter in the first pivoted grass cutting position respectively; and
    transmitting means for transmitting power of the tractor to the rotary shaft to rotate the rotary shaft in opposite rotational directions, respectively, for tilling or grass cutting with the tilling or mowing edges.

2. The rotary tilling device according to claim 1 wherein the supporting member has a rectangular shape.

3. The rotary tilling device according to claim 1 wherein said holding means is a stopper provided on the supporting member.

4. The rotary tilling device according to claim 1 wherein the second center is positioned on a center line intersecting a center of gravity of the cutter.

5. A rotary tilling device according to claim 1, wherein
said curved contour is a semicircle with the second center as its origin.

6. A rotary tilling device according to claim 5, wherein
said first and second centers are aligned on a diameter of said semicircle, which diameter is perpendicular to a longitudinal center line of the vertical portion of the cutter, said longitudinal center line intersecting said second center, said first center being offset from said second center and from said longitudinal center line along said diameter of said semicircle towards said front side.

7. A rotary tilling device according to claim 6, wherein
said cutter defines a radially outermost bottom line which is perpendicular to said longitudinal center line, and said cutter defines a line of centrifugal force intersecting said first center, the center of gravity of said cutter and said longitudinal center line, the center of gravity of said cutter being located on said longitudinal center line.

* * * * *